United States Patent
Ryu et al.

(10) Patent No.: US 9,123,968 B2
(45) Date of Patent: Sep. 1, 2015

(54) LITHIUM ION-SULFUR BATTERY AND ELECTRODE FOR THE SAME

(75) Inventors: Hee Yeon Ryu, Gyeonggi-do (KR); Sam Ick Son, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 887 days.

(21) Appl. No.: 13/109,500

(22) Filed: May 17, 2011

(65) Prior Publication Data
US 2012/0141876 A1 Jun. 7, 2012

(30) Foreign Application Priority Data
Dec. 3, 2010 (KR) .................. 10-2010-0122866

(51) Int. Cl.
*H01M 10/052* (2010.01)
*H01M 4/04* (2006.01)
*H01M 4/133* (2010.01)
*H01M 4/134* (2010.01)
*H01M 10/058* (2010.01)

(52) U.S. Cl.
CPC .......... *H01M 10/052* (2013.01); *H01M 4/0404* (2013.01); *H01M 4/133* (2013.01); *H01M 4/134* (2013.01); *H01M 10/058* (2013.01); *Y02E 60/122* (2013.01); *Y02T 10/7011* (2013.01)

(58) Field of Classification Search
USPC .............. 429/231.95, 231.9, 231.8, 208, 209, 429/233, 241, 245
See application file for complete search history.

(56) References Cited

U.S. PATENT DOCUMENTS

| | | | |
|---|---|---|---|
| 4,069,111 A * | 1/1978 | Lai | .................. 205/231 |
| 7,785,730 B2 | 8/2010 | Affinito et al. | |
| 8,372,542 B2 * | 2/2013 | Feng et al. | ............... 429/245 |
| 2006/0194115 A1 | 8/2006 | De Jonghe et al. | |
| 2009/0061288 A1 | 3/2009 | Gordon et al. | |

FOREIGN PATENT DOCUMENTS

| | | | |
|---|---|---|---|
| JP | 2003242964 A | 8/2003 | |
| JP | 2008-235083 | * 10/2008 | ........... H01M 4/02 |
| KR | 10-2001-0043145 | 5/2001 | |
| KR | 10-2003-0027395 | 4/2003 | |

* cited by examiner

*Primary Examiner* — Raymond Alejandro
(74) *Attorney, Agent, or Firm* — Mintz Levin Cohn Ferris Glovsky and Popeo, P.C.; Peter F. Corless

(57) ABSTRACT

Disclosed is a lithium ion-sulfur battery including a lithium metal used as a supply source of lithium ions, a sulfur electrode used as a positive electrode and an intercalation electrode. The intercalation electrode is (i) interposed between the lithium metal and the sulfur electrode, (ii) has a structure capable of causing an intercalation reaction, and (iii) is used as a negative electrode after the lithium ions are intercalated from the lithium metal to be charged and discharged together with the sulfur electrode. The lithium metal is used only to intercalate the lithium ions into the intercalation electrode during initial use, and the intercalation electrode, into which the lithium ions are intercalated, is used as a negative electrode during actual use. Therefore, it is possible to prevent the formation of dendrite caused when the lithium ions are used as the negative electrode, and thus the charge/discharge durability is improved.

5 Claims, 4 Drawing Sheets

LITHIUM ION-SULFUR BATTERY AND ELECTRODE FOR THE SAME

CROSS-REFERENCE TO RELATED APPLICATION

This application claims under 35 U.S.C. §119(a) the benefit of Korean Patent Application No. 10-2010-0122866 filed Dec. 3, 2010, the entire contents of which are incorporated herein by reference.

BACKGROUND (a) Technical Field

The present invention relates to a lithium ion-sulfur battery. More particularly, it relates to a structure of a lithium ion-sulfur battery which can be applied to a next-generation electric vehicle and improve charge/discharge durability.

(b) Background Art

In 1991, a lithium-ion secondary battery using an intercalation reaction was developed and industrialized. In response, the lithium-ion secondary battery has attracted much attention in the automotive industry including hybrid vehicles, plug-in hybrid vehicles, electric vehicle, etc. as well as in the battery industry itself.

As shown in FIG. 1, the lithium-ion battery has a structure, in which carbon or graphite is used as a negative electrode 1 and a lithiated transition metal intercalation compound is used as a positive electrode 2, the negative electrode 1 and the positive electrode 2 being connected by an electric circuit. During use of the lithium-ion battery, lithium ions 5 move between the positive electrode 2 and the negative electrode 1 to be intercalated into or deintercalated from the carbon material to repeat charge and discharge cycles.

The lithium-ion battery uses the carbon material as the negative electrode 1 to improve charge/discharge efficiency.

Reference numerals 3 and 4 denote a separator membrane and an electrolyte, respectively.

However, the existing lithium ion battery has a theoretical energy density of 570 Wh/kg and a maximum density of 120 Wh/kg at the current level, which is insufficient to run about 500 km, a running distance per charge of an internal combustion engine vehicle.

Therefore, the development of a battery for a next-generation vehicle having a higher energy density than the existing lithium-ion battery is required.

A lithium-sulfur battery has been studied as one of the candidates for next-generation vehicle batteries.

As shown in FIG. 2, the lithium-sulfur battery is a galvanic cell using an organic or inorganic electrolyte 4, in which lithium metal is used as a negative electrode 6 and sulfur is used as a positive electrode 7 to repeat charge and discharge cycles by an oxidation-reduction reaction. The lithium-sulfur battery has a low manufacturing cost and a high energy density (e.g., 2,600 Wh/kg).

The initial capacity of the lithium-sulfur battery is very high because the lithium metal is used as the negative electrode 6. However, as the charge/discharge cycles are repeated, dendrite 8 is deposited on the surface of the metal, thereby reducing the charge/discharge efficiency and safety.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an improved structure of a lithium ion-sulfur battery, in which an intercalation electrode is interposed between a lithium metal and a sulfur positive electrode, the lithium metal being used only to intercalate lithium ions into the intercalation electrode during initial use, and the intercalation electrode, into which the lithium ions are intercalated, being used when the lithium-ion battery is actually used. Through the use of the present invention, it is possible to significantly increase the energy density due to an increase in the capacity of the sulfur electrode, compared to a conventional lithium-ion battery, and prevent the formation of dendrite, thus improving charge/discharge durability.

In one aspect, the present invention provides a lithium ion-sulfur battery includes a lithium metal used as a supply source of lithium ions; a sulfur electrode used as a positive electrode; and an intercalation electrode which is (i) interposed between the lithium metal and the sulfur electrode, (ii) has a structure capable of causing an intercalation reaction, and (iii) is used as a negative electrode after the lithium ions are intercalated from the lithium metal to be charged and discharged together with the sulfur electrode.

In an illustrative embodiment of the present invention, the intercalation electrode is made of carbon, graphite, silicon, tin, lithium tin oxides (LTO), and/or other highly capacitive oxides which can be intercalated with the lithium ions.

In another embodiment, the intercalation electrode may be a metal electrode in the form of a mesh, whose surface is coated with graphite, the mesh metal electrode capable of intercalating the lithium ions in both directions.

In still another embodiment, the intercalation electrode comprises a metal electrode in the form of a mesh, whose surface is coated with silicon alloys or a tin alloys.

In yet another embodiment, when the utilization of the lithium ions is reduced after the lithium ions are intercalated into the intercalation electrode, the lithium ions can be further intercalated from the lithium metal to the intercalation electrode.

Other aspects and embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
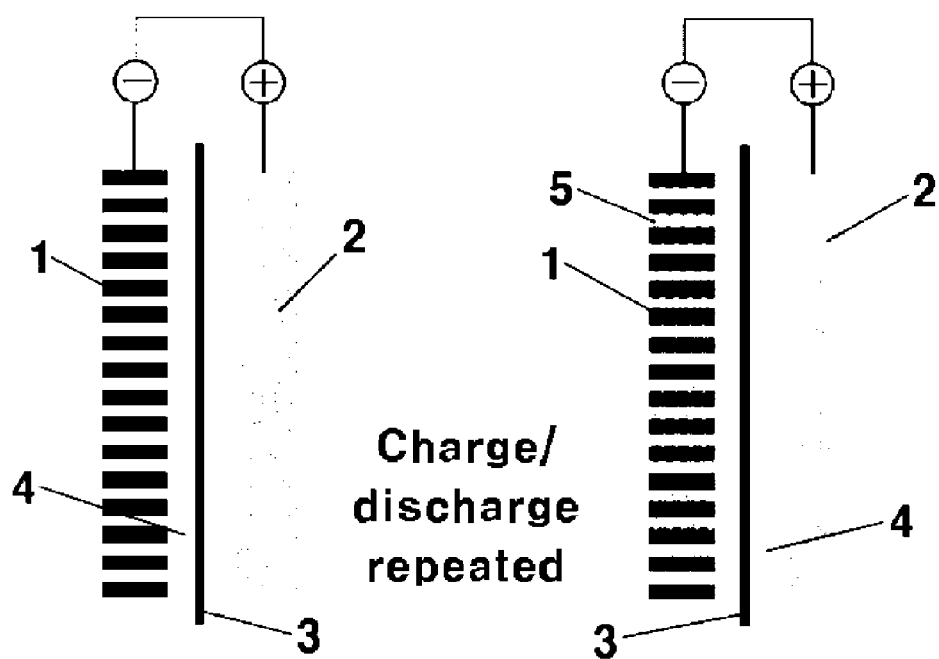
FIG. 1 is schematic diagram showing a conventional lithium-ion battery.
Figure 2:
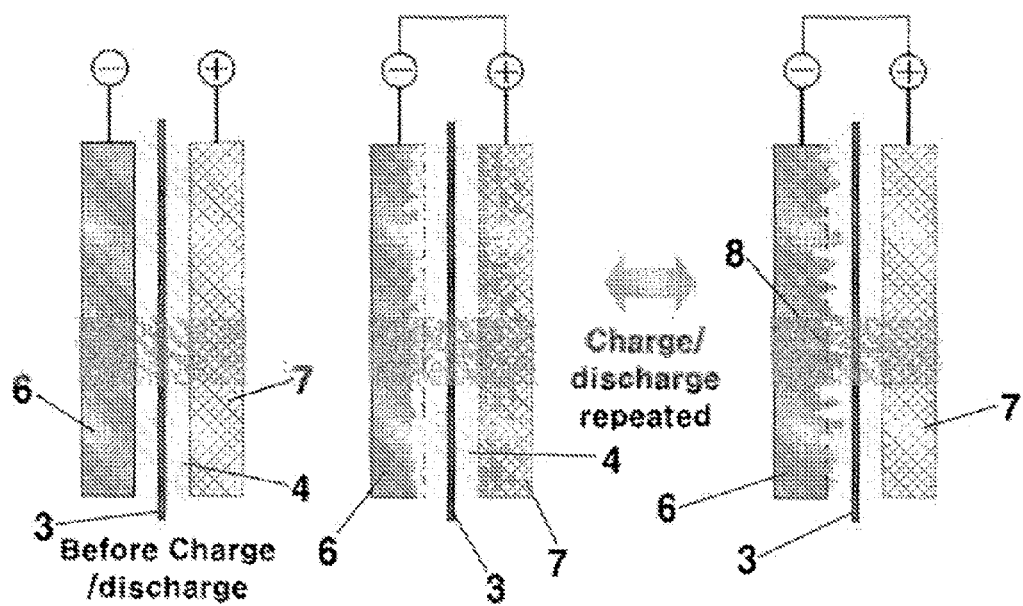
FIG. 2 is schematic diagram showing a conventional lithium-metal battery.

Reference numerals set forth in the Drawings includes reference to the following elements as further discussed below:

10: intercalation electrode
11: lithium metal
12: sulfur electrode
13: separator membrane
14: electrolyte
15: lithium ion It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 3:
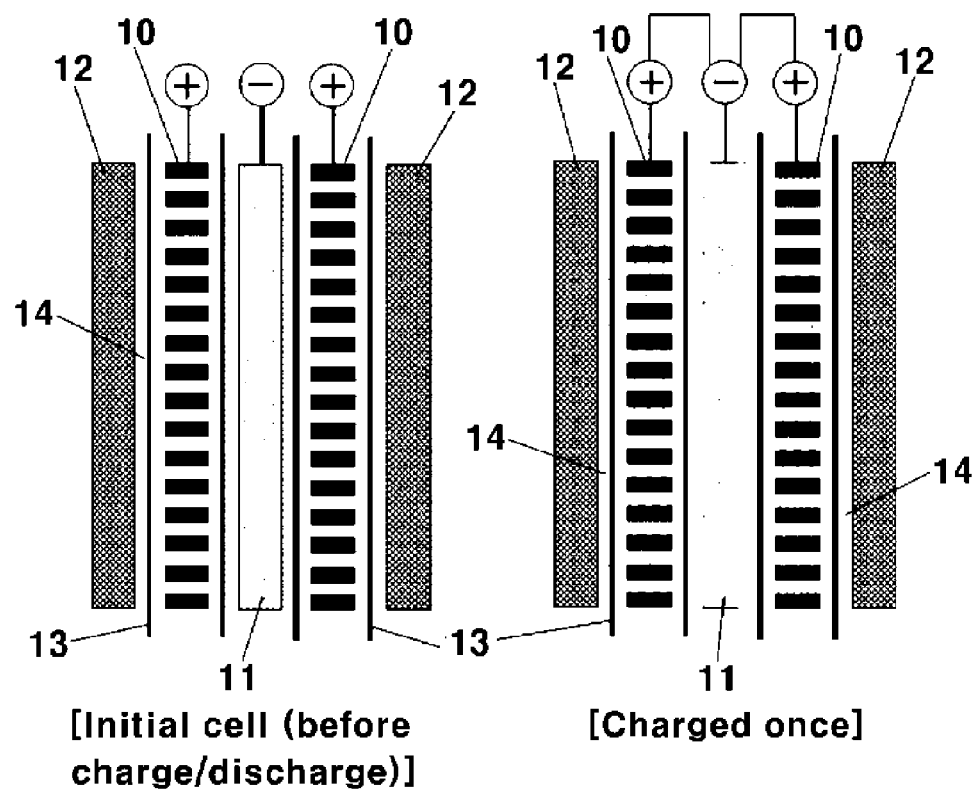
FIG. 3 is a schematic diagram showing a lithium ion-sulfur battery in accordance with an exemplary embodiment of the present invention before and after initial charge.
Figure 4:
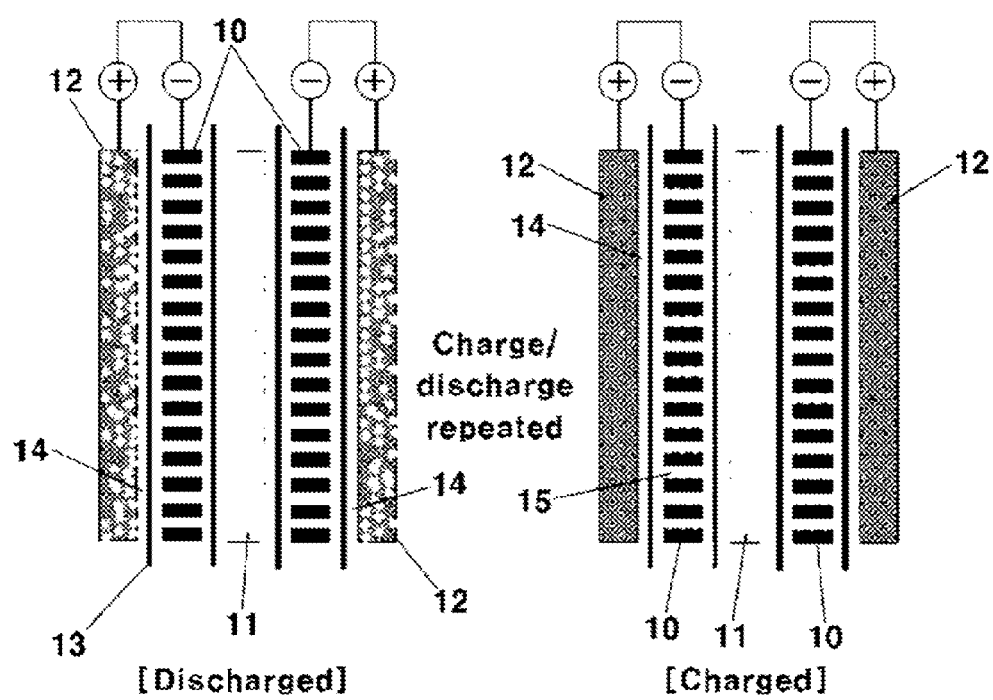
FIG. 4 is a schematic diagram showing charge/discharge states of the lithium ion-sulfur battery in FIG. 3 during actual use.

FIG. 3 is a schematic diagram showing a lithium ion-sulfur battery in accordance with an illustrative embodiment of the present invention before and after initial charge, and FIG. 4 is a schematic diagram showing charge/discharge states of the lithium ion-sulfur battery in FIG. 3 during actual use.

The present invention provides a lithium ion-sulfur battery, which can be applied to a next-generation electric vehicle, and especially, a lithium ion-sulfur battery having improved charge/discharge efficiency and a high energy density.

The lithium ion-sulfur battery according to the present invention includes a lithium metal 11 for supplying lithium ions 15, a sulfur electrode 12 used as a positive electrode, and an intercalation electrode 10 interposed between the lithium metal 11 and the sulfur electrode 12 and used as a negative electrode.

As shown in FIG. 3, the lithium ion-sulfur battery has a separator membrane 13, the intercalation electrode 10, the separator membrane 13, and the sulfur electrode 12, which are sequentially stacked on both sides of the lithium metal 11, and an electrolyte 14 impregnated therein.

In detail, in the lithium ion-sulfur battery, the sulfur electrode 12, the separator membrane 13, the intercalation electrode 10, the separator membrane 13, the lithium metal 11, the separator membrane 13, the intercalation electrode 10, the separator membrane 13, and the sulfur electrode 12 are stacked in this order.

FIG. 3A is a schematic diagram showing an initial cell before charge/discharge after a battery cell is manufactured.

As shown in FIG. 3A, in the initial stage of manufacturing the cell, the lithium ions 15 are not intercalated into the intercalation electrode 10, and the lithium metal 11 and the intercalation electrode 10 are connected by an electric circuit so that the lithium ions 15 of the lithium metal 11 are intercalated into the intercalation electrode 10.

FIG. 3B is a schematic diagram showing the state where the lithium ions 15 are intercalated into the intercalation electrode 10 during initial use. The lithium metal 11 is not used after the lithium ions 15 are intercalated into the intercalation electrode 10 at first. But, when the utilization of the lithium ions 15 is reduced due to the repetition of charge/discharge cycles, the lithium ions 15 can be further intercalated into the intercalation electrode 10.

Moreover, as shown in FIG. 4, after the lithium ions 15 are completely intercalated into the intercalation electrode 10, the electric circuit connected between the lithium metal 11 and the intercalation electrode 10 is disconnected, and the electric circuit connected between the intercalation electrode 10, into which the lithium ions 15 are intercalated, and the sulfur electrode 12 is connected so that it can be used as an actual battery.

The intercalation electrode 10 may be made of any material capable of being intercalated such as carbon, graphite, silicon, tin, lithium tin oxides (LTO), and other highly capacitive oxides, etc. Moreover, an electrode metal supporting the intercalation electrode 10 has a mesh structure that can intercalate the lithium ions 15 in both directions. When the lithium ion-sulfur battery according to the present invention is used, in which the intercalation electrode 10, into which the lithium ions 15 are intercalated from the lithium metal 11, is used as the negative electrode, and the sulfur electrode 12 is used as the positive electrode, the intercalation electrode 10 and the sulfur electrode 12 being connected by the electric circuit, the lithium ions 15 are deintercalated from the intercalation electrode 10 to the sulfur electrode 12 during discharge (refer to FIG. 4A) and move from the sulfur electrode 12 to the intercalation electrode 10 to be intercalated into the intercalation electrode 10 during charge (refer to FIG. 4B).

In other words, the lithium ion-sulfur battery after manufacturing is used by connecting the lithium metal 11 and the intercalation electrode 10 via an electric circuit to allow the lithium ions 15 to be intercalated into the intercalation electrode 10 at first. Then, the lithium metal 11 is not used during normal operation, and the intercalation electrode 10, into which the lithium ions 15 are intercalated, and the sulfur electrode 12 are used as the negative and positive electrodes to react with each other, thereby storing (charging) or using (discharging) electrical energy. At this time, an intercalation reaction occurs in the negative electrode, and an oxidation-reduction reaction occurs in the positive electrode.

Therefore, according to the present invention, the intercalation electrode 10 into which the lithium ions 15 are intercalated is interposed between the lithium metal 11 and the sulfur electrode 12, and the lithium metal 11 is used only to intercalate the lithium ions 15 into the intercalation electrode 10 during initial use of the lithium ion-sulfur battery. When the battery is actually used, the intercalation electrode 10, into which the lithium ions 15 are intercalated, and the sulfur electrode 12 are used as the negative and positive electrodes to react with each other. As a result, it is possible to prevent the formation of dendrite caused when the lithium ions 15 are used as the negative electrode, and thus the charge/discharge durability is improved.

Moreover, the lithium ion-sulfur battery according to the present invention can be applied to electric vehicles, for example, and thus it is expected that a next-generation electric vehicle having the same running distance and durability as the conventional internal combustion engine vehicle can be developed.

Next, the present invention will be described in more detail with reference to the following examples, but the present invention is not limited to the following examples.

EXAMPLE

In an exemplary embodiment of the present invention, a lithium ion-sulfur battery is configured by interposing an intercalation electrode 10 between a lithium metal 11 (e.g., Li metal foil, available from Hohsen Corp.) and a sulfur electrode 12 and using an electrolyte 14 (e.g., 1M $LiCF_3SO_3$/ 0.5M LiTFSI+DME [1,2-Dimethoxyethane, anhydrous, 99.5%], available from Aldrich Chemical Co.) and a separator membrane 13 (e.g., Celgard 2325, available from Celgard Inc.).

Here, the sulfur electrode 12 is formed into a positive electrode using 70% sulfur (e.g., 100 mesh, available from Aldrich Chemical Co.), 15% conductive carbon (e.g., Ketjen Black EC-300J, available from Mitsubishi Chemical Corp.), and 15% binder (e.g., PVdF available from Kynar).

Moreover, the intercalation electrode 10 may be formed by coating graphite on a copper metal in the form of a mesh.

After manufacturing a battery cell in the above manner, the intercalation electrode 10 and the lithium metal 11 are connected by an electric circuit so that lithium ions 15 are intercalated from the lithium metal 11 to the intercalation electrode 10.

Then, the intercalation electrode 10, into which the lithium ions 15 are intercalated, and the sulfur electrode 12 are used as the negative and positive electrodes to be electrochemically charged and discharged. For example, a silicon alloy or a tin alloy may be used as the intercalation electrode 10 instead of graphite, if necessary.

Advantageously, the intercalation electrode is interposed between the lithium metal and the sulfur positive electrode, the lithium metal is used only to intercalate the lithium ions into the intercalation electrode during initial use, and the intercalation electrode, into which the lithium ions are intercalated, and the sulfur electrode are used as the negative and positive electrodes to react with each other. As a result, it is possible to prevent the formation of dendrite caused when the lithium ions are used as the negative electrode, and thus the charge/discharge durability is improved.

Moreover, the lithium ion-sulfur battery according to the present invention can be applied to electric vehicles, for example, and thus it is expected that a next-generation electric vehicle having the same running distance and durability as the conventional internal combustion engine vehicle combustion can be developed.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A lithium ion-sulfur battery comprising:
a lithium metal plate as a supply source of lithium ions;
first and second sulfur electrodes as positive electrodes;
first and second intercalation electrodes as negative electrodes after the lithium ions are intercalated from the lithium metal plate to be charged and discharged together with the first and second sulfur electrodes, wherein each of the first and second intercalation electrodes is interposed between the lithium metal plate and each of the first and second sulfur electrodes, and each of the first and second intercalation electrodes comprises a metal electrode in the form of a mesh to have a structure receiving the intercalated lithium ions;
first, second, third and fourth separator membranes; and
an electrolyte,
wherein the first separator membrane, the first intercalation electrode, the second separator membrane, and the first sulfur electrode are sequentially stacked on a first side of the lithium metal plate; the third separator membrane, the second intercalation electrode, the fourth separator membrane and the second sulfur electrode are sequentially stacked on a second side of the lithium metal plate opposed of the first side; and the electrolyte is impregnated therein, such that the lithium metal plate only supplies the lithium ions into the first and second intercalation electrodes during initial charge and the lithium metal plate is disconnected from electric circuits to the first and second intercalation electrodes, each of the first and second intercalation electrodes is connected to each of the first and second sulfur electrodes and serve as negative electrodes in the lithium ion-sulfur battery.

2. The lithium ion-sulfur battery of claim 1, wherein the intercalation electrode comprises at least one selected from the group consisting of carbon, graphite, silicon, tin, lithium tin oxides, and oxides which are intercalated with the lithium ions.

3. The lithium ion-sulfur battery of claim 1, wherein the intercalation electrode comprises a metal electrode in the form of a mesh, whose surface is coated with graphite, the mesh metal electrode capable of intercalating the lithium ions in both directions.

4. The lithium ion-sulfur battery of claim 1, wherein the intercalation electrode comprises a metal electrode in the form of a mesh, whose surface is coated with silicon alloy or a tin alloy.

5. The lithium ion-sulfur battery of claim 1, wherein when an amount of the intercalated lithium ions in the first and second intercalating electrodes is reduced, the lithium ions are further supplied from the lithium metal to the intercalation electrode.

* * * * *